United States Patent
Janson

(10) Patent No.: US 10,173,517 B2
(45) Date of Patent: Jan. 8, 2019

(54) TWO AXIS TRANSAXLE FOR A HYBRID ELECTRIC VEHICLE

(71) Applicant: FORD GLOBAL TECHNOLOGIES, LLC, Dearborn, MI (US)

(72) Inventor: David A. Janson, Plymouth, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 1164 days.

(21) Appl. No.: 13/910,267

(22) Filed: Jun. 5, 2013

(65) Prior Publication Data

US 2014/0364266 A1  Dec. 11, 2014

(51) Int. Cl.
*B60K 6/50* (2007.10)
*B60K 6/40* (2007.10)

(52) U.S. Cl.
CPC .............. *B60K 6/50* (2013.01); *B60K 6/40* (2013.01); *B60Y 2300/58* (2013.01); *B60Y 2304/01* (2013.01)

(58) Field of Classification Search
CPC ......... B60K 6/40; B60K 6/50; B60Y 2300/58
See application file for complete search history.

(56) References Cited

U.S. PATENT DOCUMENTS

| 7,497,285 B1 * | 3/2009 | Radev | B60K 6/26 180/65.225 |
| 2002/0094898 A1 | 7/2002 | Hata et al. | |
| 2004/0108149 A1 * | 6/2004 | Adachi | B60K 6/26 180/65.235 |
| 2004/0112654 A1 * | 6/2004 | Kozarekar | B60K 6/22 180/65.235 |
| 2004/0176203 A1 * | 9/2004 | Supina | B60K 6/40 475/8 |
| 2005/0101425 A1 * | 5/2005 | Yamauchi | B60K 6/365 475/5 |
| 2005/0205382 A1 * | 9/2005 | Tryon | F16D 25/0638 192/214 |
| 2005/0211479 A1 * | 9/2005 | Tamor | B60K 6/48 180/65.25 |
| 2006/0011395 A1 * | 1/2006 | Sugiyama | B60K 6/365 180/65.235 |
| 2011/0290608 A1 * | 12/2011 | Bird | F16D 27/004 192/45.1 |
| 2013/0066494 A1 * | 3/2013 | Kamijo | F02N 11/0844 701/22 |

FOREIGN PATENT DOCUMENTS

FR  2772442 A1  6/1999

OTHER PUBLICATIONS

"Held against." The Free Dictionary. Farlex, n.d. Web. Apr. 30, 2016. <http://www.thefreedictionary.com/held+against>.*

* cited by examiner

*Primary Examiner* — Justin Holmes
(74) *Attorney, Agent, or Firm* — David B. Kelley; MacMillan, Sobanski & Todd, LLC

(57) ABSTRACT

A vehicle transaxle includes an input, a splitter gearset including a member connected to the input, a second member connected to a motor-generator and a first output, a traction gearset including a third member connected to a traction motor, a fourth non-rotating member and a second output, a chain drive connected to the first and second outputs, and a differential driven by the chain drive for transmitting power to vehicle wheels.

21 Claims, 2 Drawing Sheets

TWO AXIS TRANSAXLE FOR A HYBRID ELECTRIC VEHICLE

BACKGROUND OF THE INVENTION

1. Field of the Invention

This invention relates generally to a transaxle that transmits power between multiple power sources to the vehicle wheels using a chain drive.

2. Description of the Prior Art

In a hybrid electric vehicle the traction motor, electric generator, planetary gearing, and engine are preferably located on a common axis of the vehicle's transaxle, which must be fitted between the vehicle's frame rails. Yet the axial dimension of the transaxle must be minimized. When the components of the transaxle are located on three axes, layshaft gearing is required to transmit power between a differential, which is concentric with the vehicle's driven wheels, and the engine axis. Such layshaft gearing, however, tends to lengthen the transaxle's axial dimension.

A conventional torsion damper, located between the engine and electric generator, increases the axial dimension.

Supporting the electric generator on the case wall using two axially-spaced bearings and supporting the traction motor on the case using two additional axially-spaced bearings further increases the axial dimension.

SUMMARY OF THE INVENTION

A vehicle transaxle includes an input, a splitter gearset including a member connected to the input, a second member connected to a motor-generator and a first output, a traction gearset including a third member connected to a traction motor, a fourth non-rotating member and a second output, a chain drive connected to the first and second outputs, and a differential driven by the chain drive for transmitting power to vehicle wheels.

The traction motor, electric generator and, planetary gearing are supported by needle bearing on the input, which is supported by ball bearing on the transaxle case. A pulley of the chain drive is supported by a ball bearing also on the input.

The torsion bar damper is fitted within the input and extends axially along the main axis of the transaxle, thereby saving axial space.

The carrier of each planetary gearset is its output and the ring gear is its reaction component, thereby allowing each gearset to function with optimal efficiency.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
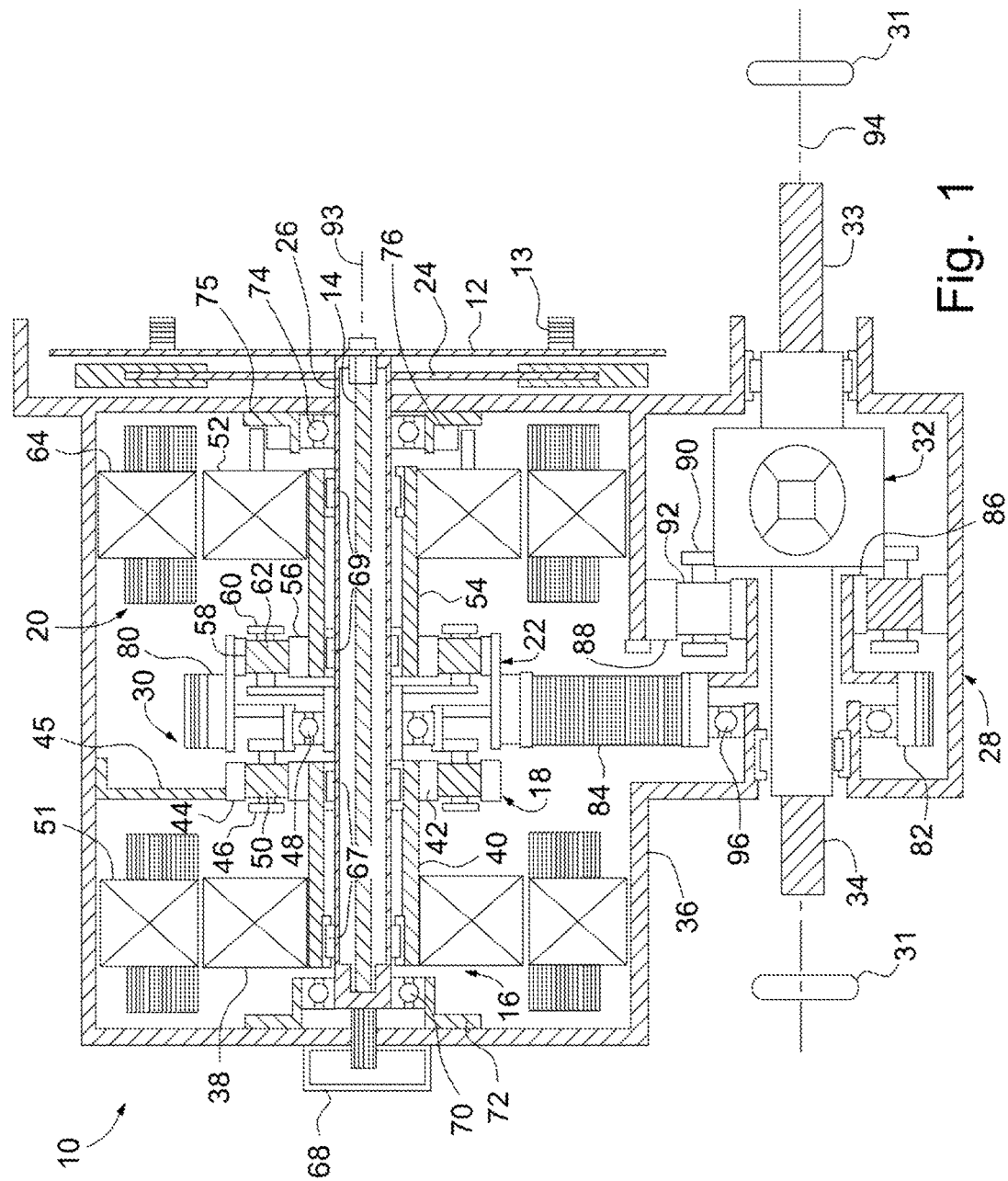
FIG. 1 is a schematic diagram showing a transaxle for a hybrid electric vehicle.

The transaxle 10 shown in FIG. 1 includes a flex plate 12 having axial studs 13 by which the flex plate is connected to an engine; shaft 14 connected to the flex plate; traction motor 16; traction planetary gearset 18; motor-generator 20; splitter planetary gearset 22; pendulum torsion damper 24, secured to an input shaft 26; final drive planetary gearset 28; chain drive 30; and differential 32, which transmits power to the vehicle wheels 31 through half shafts 33, 34. The transaxle 10 is enclosed in a non-rotating case 36.

The rotor 38 of traction motor 16 is connected by shaft 40 to the sun gear 42 of the traction planetary gearset 18, which further includes a ring gear 44, held against rotation on a reaction arm 45 of case 36; carrier 46, supported on input shaft 26 by a bearing 48; and pinions 50, supported on carrier 46 and meshing with ring gear 44 and sun gear 42. The traction drive planetary gearset 18 produces a speed reduction of carrier 46 relative to the speed of the rotor 38 of traction motor 16. The stator 51 of traction motor 16 is supported on case 36.

The rotor 52 of motor-generator 20 is connected by shaft 54 to the sun gear 56 of the splitter planetary gearset 22, which further includes a ring gear 58; a carrier 60, secured to input shaft 26; and pinions 62, supported on carrier 60 and meshing with ring gear 58 and sun gear 56. The stator 64 of motor-generator 20 is supported on case 36.

Input shaft 26 is driveably connected to shaft 14, which extends axially from flex plate 12 along input shaft 26. Shaft 14 is connected to input shaft 26 at the axial end near a fluid pump 68.

Two axially-spaced needle bearings 67 support rotor 38 and shaft 40 on input shaft 26. Similarly two axially-spaced needle bearings 69 support rotor 52 and shaft 54 on input shaft 26. Shaft 14 is supported at opposite axial ends on input shaft 26.

A bearing 70, supported on a bracket 72, which is fixed to the rear wall of case 36, supports the left-hand end of input shaft 26. Similarly a bearing 74, supported on a bracket 75, which is fixed to the front wall of case 36, supports the right-hand end of input shaft 26.

A generator brake 76, supported on a bracket 75, selectively holds the rotor 52 of motor-generator 20 against rotation.

The chain drive 30 includes a pulley 80, secured to ring gear 58; a pulley 82, connected to the final drive planetary gearset 28, and a drive chain 84, engaged with the pulley 80, 82.

The final drive planetary gearset 28 includes a sun gear 86, which is connected to pulley 82; a ring gear 88, which is secured to case 36; a carrier 90, which is secured to the ring gear input of differential 32; and planet pinions 92, which are supported on carrier 90 and mesh with ring gear 88 and sun gear 86. The final drive planetary gearset 28 produces a speed reduction of the input of differential 32 relative to the speed of carrier 90.

The components of transaxle 10 are arranged about a main axis 93 and a wheel axis 94. A bearing 96, supported on the wall of case 36, supports pulley 82 and sun gear 86 in rotation about axis 94.

Figure 2:
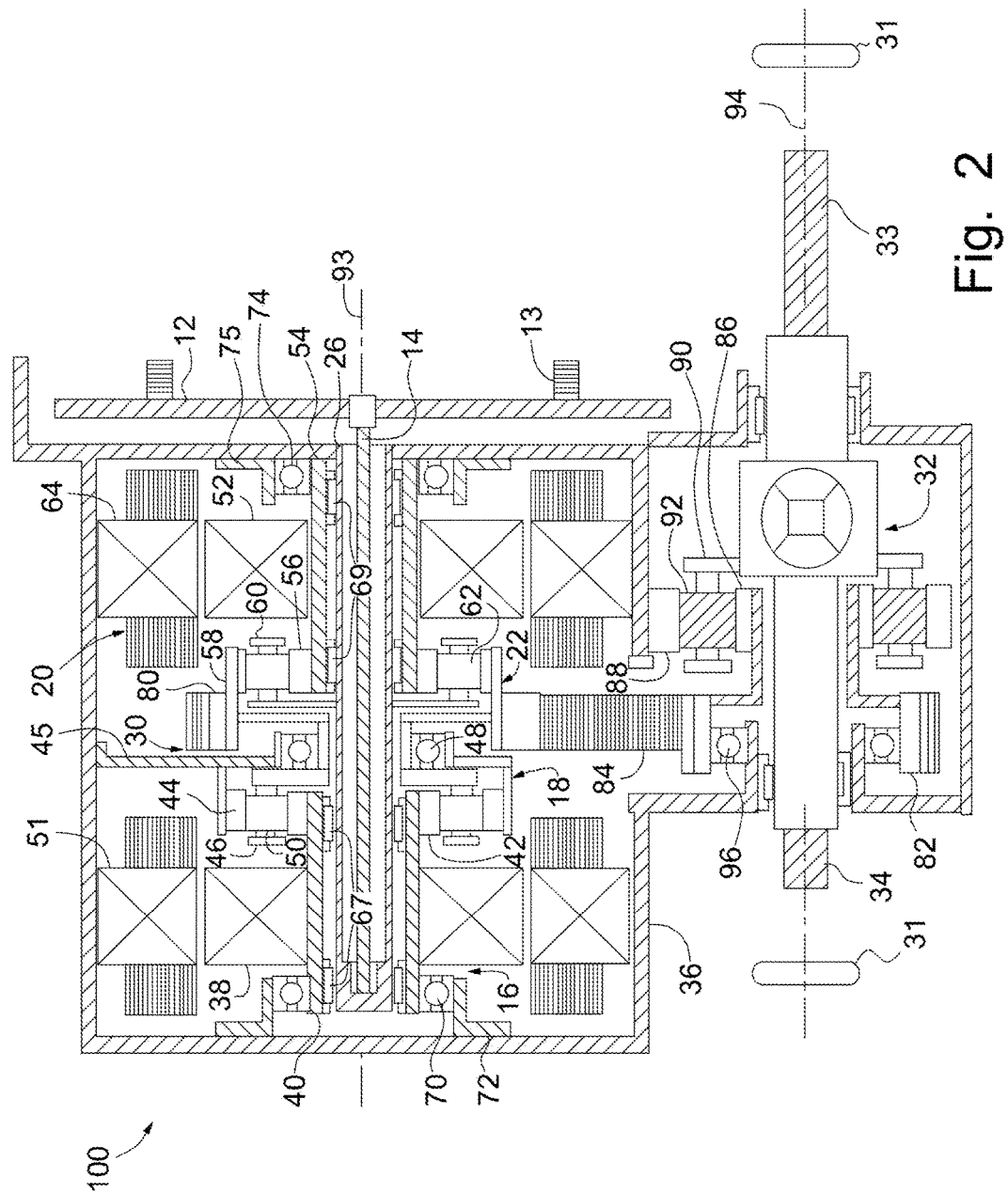
FIG. 2 is a schematic diagram showing a variation of the transaxle of FIG. 1.

The transaxle 100 shown in FIG. 2 includes a flex plate 12 supported on a shaft 14, which is connected to an engine crankshaft; traction motor 16; traction drive planetary gearset 18; motor-generator 20; splitter planetary gearset 22; final drive planetary gearset 28; chain drive 30; and differential 32, which transmits power to the vehicle wheels 31 through half shafts 33, 34. The transaxle 10 is enclosed in a non-rotating case 36.

Input shaft 26 is driveably connected to shaft 14, which extends axially from flex plate 12 along input shaft 26. Shaft 14 is connected to input shaft 26 at the axial end opposite flex plate 12.

In transaxle 100, bearing 45 supports carrier 46 of gearset 18 on a reaction arm 45, which is secured to and extends radially from the case 36, rather than bearing 45 being supported on shaft 26.

The pendulum damper 24, fluid pump 68 and generator brake 76 are absent from transaxle 100.

In accordance with the provisions of the patent statutes, the preferred embodiment has been described. However, it should be noted that the alternate embodiments can be practiced otherwise than as specifically illustrated and described.

The invention claimed is:

1. A vehicle transaxle, comprising:
   an input supported on a case;
   a traction motor, a traction gearset, a generator, a splitter gearset, and a pulley of a chain drive supported on the input, the traction gearset having a traction ring gear held against rotation;
   a differential connected to the chain drive for transmitting power to vehicle wheels.

2. The vehicle transaxle of claim 1, wherein the input is a sleeve shaft that extends along a first axis, and the transaxle further comprise:
   a flex plate;
   a shaft concentric with the input, extending along the input, secured to the input and supporting the flex plate thereon.

3. The vehicle transaxle of claim 1, further comprising:
   first needle bearings supporting the generator and the splitter gearset on the input; and
   second needle bearings supporting the traction motor and the traction gearset on the input.

4. The vehicle transaxle of claim 1, wherein:
   the splitter gearset includes a carrier connected to the input, a sun gear connected to the generator, a ring gear connected to the pulley, and pinions supported on the carrier and meshing with the ring gear and the sun gear.

5. The vehicle transaxle of claim 1, wherein:
   the traction gearset includes a second sun gear connected to the traction motor, a second carrier connected to the pulley, and second pinions supported on the second carrier and meshing with the traction ring gear and the second sun gear.

6. The vehicle transaxle of claim 1, wherein:
   the splitter gearset includes a carrier connected to the input, a sun gear connected to the generator, a ring gear connected to the pulley, and pinions supported on the carrier and meshing with the ring gear and the sun gear; and
   the traction gearset includes a second sun gear connected to the traction motor, a second carrier connected to the pulley and the ring gear, and second pinions supported on the second carrier and meshing with the traction ring gear and the second sun gear.

7. The vehicle transaxle of claim 1, further comprising a final drive including:
   a third sun gear connected to the chain drive;
   a final drive ring gear held against rotation;
   a third carrier connected to the differential; and
   third pinions supported on the third carrier and meshing with the third sun gear and the final drive gear.

8. The vehicle transaxle of claim 1, wherein the input is a sleeve shaft extending along a first axis and having first and second axially opposite ends; and the transaxle further comprises:
   a shaft extending along the input and having first and second axially opposite ends, the first shaft end supporting a flex plate, the second shaft end being secured to the first end of the input that is farther from a location of the flex plate than the second end of the input.

9. A vehicle transaxle, comprising:
   an input;
   a splitter gearset including a member connected to the input, a second member connected to a motor-generator and a first output;
   a traction gearset including a third member connected to a traction motor, a fourth non-rotating member and a second output;
   a chain drive connected to the first and second outputs;
   a differential driven by the chain drive for transmitting power to vehicle wheels;
   a brake for holding a rotor of the motor-generator against rotation.

10. The vehicle transaxle of claim 9, further comprising:
    a first axis about which the input, the splitter gearset, the motor-generator, the traction gearset and the traction motor are concentric;
    a second axis parallel to the first axis, the differential being concentric with the second axis; and
    the chain drive connects the differential to the first and second outputs.

11. The vehicle transaxle of claim 9, wherein:
    the member is a first carrier;
    the second member is a first sun gear;
    the first output is a first ring gear; and
    the splitter gearset further includes first pinions supported on the first carrier and meshing with the first sun gear and the first ring gear.

12. The vehicle transaxle of claim 9, wherein:
    the third member is a second sun gear;
    the fourth member is a second ring gear;
    the second output is a second carrier; and
    the traction gearset further includes second pinions supported on the second carrier and meshing with the second sun gear and second ring gear.

13. The vehicle transaxle of claim 9, further comprising:
    a shaft supporting a flex plate, the shaft being concentric with the input and secured to the input.

14. The vehicle transaxle of claim 9, further comprising a final drive including:
    a third sun gear connected to the chain drive;
    a third ring gear held against rotation;
    a third carrier connected to the differential; and
    third pinions supported on the third carrier and meshing with the third sun gear and the third ring gear.

15. The vehicle transaxle of claim 9, wherein the input is a sleeve shaft extending along a first axis and having first and second axially opposite ends; and further comprising:
    a shaft extending along the input and having first and second axially opposite ends, the first shaft end supporting a flex plate, the second shaft end being secured to the first end of the input that is farther from a location of the flex plate than the second end of the input;
    a pump driveably connected to the input.

16. A vehicle transaxle, comprising:
an input;
a shaft inside, and secured to, the input and supporting a flex plate;
a splitter gearset including a member connected to the input, a second member connected to a motor-generator and a first output;
a traction gearset including a third member connected to a traction motor, a fourth non-rotating member and a second output;
a chain drive connected to the first and second outputs;
a differential driven by the chain drive.

17. The vehicle transaxle of claim 16, further comprising:
a first axis about which the input, the splitter gearset, the motor-generator, the traction gearset and the traction motor are concentric;
a second axis parallel to the first axis, the differential being concentric with the second axis; and
the chain drive connects the differential to the first and second outputs.

18. The vehicle transaxle of claim 16, wherein:
the member is a first carrier;
the second member is a first sun gear;
the first output is a first ring gear; and
the splitter gearset further includes first pinions supported on the first carrier and meshing with the first sun gear and the first ring gear.

19. The vehicle transaxle of claim 16, wherein:
the third member is a second sun gear;
the fourth member is a second ring gear;
the second output is a second carrier; and
the traction gearset further includes second pinions supported on the second carrier and meshing with the second sun gear and second ring gear.

20. The vehicle transaxle of claim 16, further comprising a final drive including:
a third sun gear connected to the chain drive;
a third ring gear held against rotation;
a third carrier connected to the differential; and
third pinions supported on the third carrier and meshing with the third sun gear and the third ring gear.

21. The vehicle transaxle of claim 16, wherein the input is a sleeve shaft extending along a first axis and having first and second axially opposite ends; and further comprising:
the shaft extending along the input and having first and second axially opposite ends, the first shaft end supporting the flex plate, the second shaft end being secured to the first end of the input that is farther from a location of the flex plate than the second end of the input.

* * * * *